(12) United States Patent
Kawada

(10) Patent No.: US 11,032,129 B2
(45) Date of Patent: Jun. 8, 2021

(54) INFORMATION PROCESSING APPARATUS, NETWORK SYSTEM, AND COMPUTER-READABLE RECORDING MEDIUM

(71) Applicant: FUJITSU LIMITED, Kawasaki (JP)

(72) Inventor: Tomoki Kawada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 16/683,904

(22) Filed: Nov. 14, 2019

(65) Prior Publication Data
US 2020/0162314 A1 May 21, 2020

(30) Foreign Application Priority Data

Nov. 19, 2018 (JP) .............................. JP2018-216400

(51) Int. Cl.
*H04L 12/24* (2006.01)
*H04L 12/46* (2006.01)

(52) U.S. Cl.
CPC ...... *H04L 41/0668* (2013.01); *H04L 12/4641* (2013.01); *H04L 41/0816* (2013.01)

(58) Field of Classification Search
None
See application file for complete search history.

(56) References Cited

U.S. PATENT DOCUMENTS

| 6,032,266 A * | 2/2000 | Ichinohe ............. H04L 41/0213 714/21 |
| 2006/0206602 A1* | 9/2006 | Hunter .................. H04L 49/557 709/223 |
| 2008/0089226 A1 | 4/2008 | Konuma et al. |
| 2008/0130644 A1 | 6/2008 | Shibata et al. |
| 2010/0077067 A1* | 3/2010 | Strole ............... G06F 15/17393 709/223 |

(Continued)

FOREIGN PATENT DOCUMENTS

| JP | 2002-252625 A | 9/2002 |
| JP | 2008-141645 A | 6/2008 |
| WO | 2006/114809 A1 | 11/2006 |

*Primary Examiner* — Kenny S Lin
(74) *Attorney, Agent, or Firm* — Fujitsu Patent Center

(57) ABSTRACT

An information processing apparatus includes: a memory; and a processor coupled to the memory and configured to: perform switching to a transmission device in a standby status of transmission devices in a redundant configuration when a transmission device under operation configuration fails; store, as normal coupling information, coupling information at a time when a network system, constituted by the information processing apparatus and the transmission devices, is normal, the coupling information being information on a transmission device port to which a communication control device is coupled; when the transmission device to which the communication control device is coupled is repaired or replaced, determine whether the coupling information transmitted from the transmission device after the repair or replacement matches with the normal coupling information; and control communications between the communication control device and the transmission device port to which the communication control device is coupled based on the determination result.

11 Claims, 12 Drawing Sheets

(56) References Cited

U.S. PATENT DOCUMENTS

| | | | |
|---|---|---|---|
| 2012/0039163 A1* | 2/2012 | Nakajima | H04L 49/357 370/217 |
| 2013/0010639 A1* | 1/2013 | Armstrong | H04L 41/0659 370/254 |
| 2013/0013957 A1* | 1/2013 | Armstrong | H04L 41/0654 714/4.12 |
| 2015/0055656 A1* | 2/2015 | Morimoto | H04L 49/30 370/392 |
| 2015/0149813 A1* | 5/2015 | Mizuno | G06F 11/1484 714/4.11 |
| 2015/0205650 A1* | 7/2015 | Shimada | G06F 11/008 714/703 |
| 2016/0099862 A1* | 4/2016 | Stellick | H04L 41/0663 709/223 |
| 2016/0179638 A1* | 6/2016 | Berry | G06F 11/1458 714/4.12 |
| 2020/0133538 A1* | 4/2020 | Nelogal | G06F 11/2089 |

* cited by examiner

FIG. 2A

VLAN COUPLING INFORMATION OF PORT #1 (INCLUDING TWO VLANS)

| VLAN CONFIGURATION INFORMATION OF VLAN #1 | | | VLAN CONFIGURATION INFORMATION OF VLAN #10 | | |
|---|---|---|---|---|---|
| CONSTITUENT PORT | tag/untag | LINK STATUS | CONSTITUENT PORT | tag/untag | LINK STATUS |
| PORT #1 | untag | up | PORT #1 | tag | up |
| PORT #19 | tag | up | PORT #2 | tag | up |
| PORT #20 | tag | down | PORT #3 | tag | up |
| — | — | — | PORT #21 | tag | up |

FIG. 2B

VLAN COUPLING INFORMATION OF PORT #2 (INCLUDING ONLY ONE VLAN)

| VLAN CONFIGURATION INFORMATION OF VLAN #10 | | |
|---|---|---|
| CONSTITUENT PORT | tag/untag | LINK STATUS |
| PORT #1 | tag | up |
| PORT #2 | tag | up |
| PORT #3 | tag | up |
| PORT #21 | tag | up |

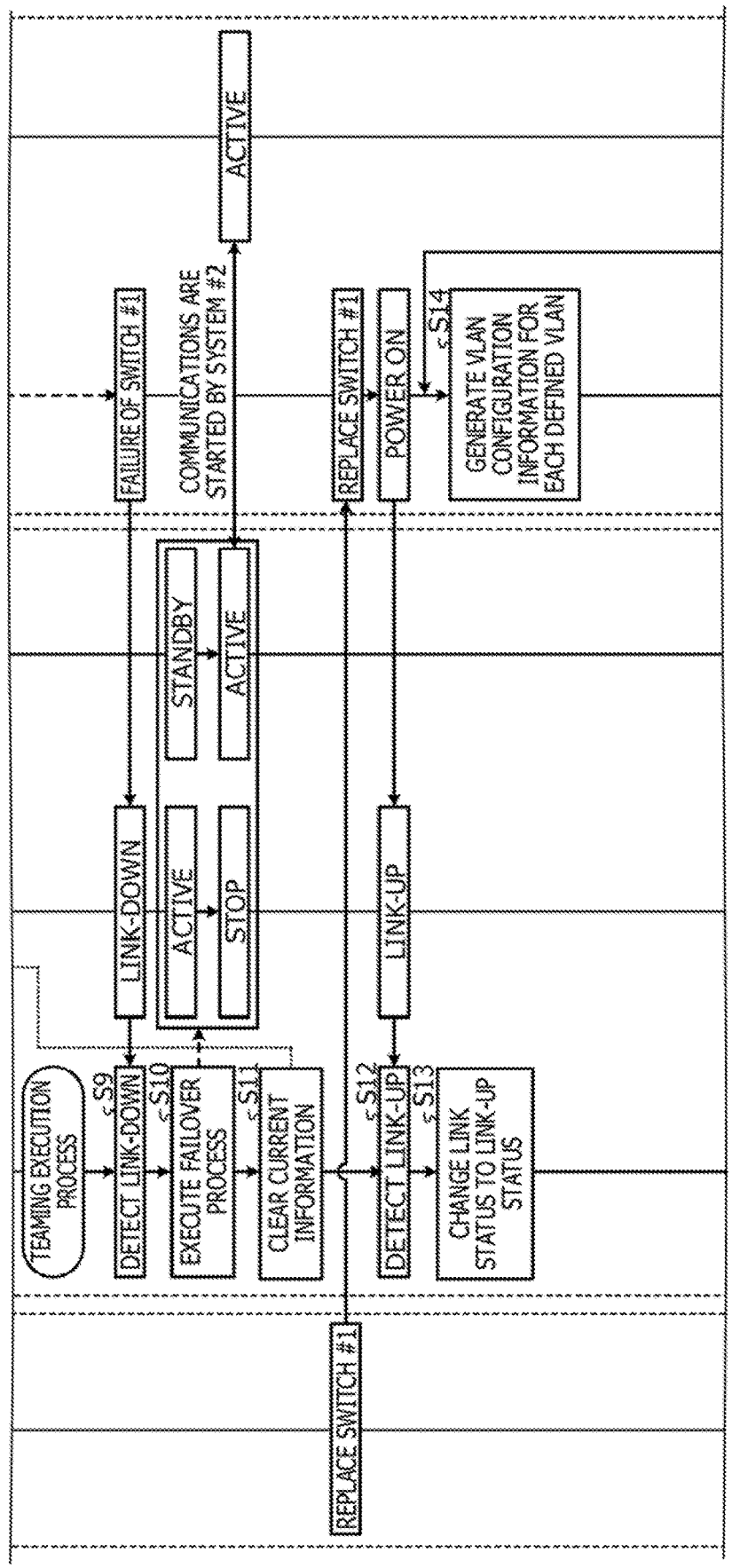

INFORMATION PROCESSING APPARATUS, NETWORK SYSTEM, AND COMPUTER-READABLE RECORDING MEDIUM

CROSS-REFERENCE TO RELATED APPLICATION

This application is based upon and claims the benefit of priority of the prior Japanese Patent Application No. 2018-216400, filed on Nov. 19, 2018, the entire contents of which are incorporated herein by reference.

FIELD

The embodiment discussed herein is related to an information processing apparatus, a network system, and a computer-readable recording medium.

BACKGROUND

Paths for use in communications by an information processing apparatus are made redundant by teaming using two switches and two network interface cards (NIC).

Related techniques are disclosed in, for example, Japanese Laid-open Patent Publication Nos. 2002-252625 and 2008-141645 and International Publication Pamphlet No. WO 2006/114809.

SUMMARY

According to an aspect of the embodiments, an information processing apparatus includes: a memory; and a processor coupled to the memory and configured to: perform switching to a transmission device in a standby status of transmission devices in a redundant configuration when a transmission device under operation of the transmission devices in the redundant configuration fails; store, as normal coupling information, coupling information at a time when a network system, which is constituted by the information processing apparatus and the transmission devices in the redundant configuration, is normal, the coupling information being information on a transmission device port to which a communication control device included in the information processing apparatus is coupled; when the transmission device to which the communication control device is coupled is repaired or replaced, determine whether or not the coupling information transmitted from the transmission device after the repair or replacement matches with the normal coupling information; and control communications between the communication control device and the transmission device port to which the communication control device is coupled based on the determination result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a diagram illustrating an example of VLAN coupling information (in the case where two VLANs are included);

FIG. 2B is a diagram illustrating an example of VLAN coupling information (in the case where only one VLAN is included);

FIGS. 5A to 5E are a diagram illustrating a sequence of a teaming process;

DESCRIPTION OF EMBODIMENTS

Figure 7:
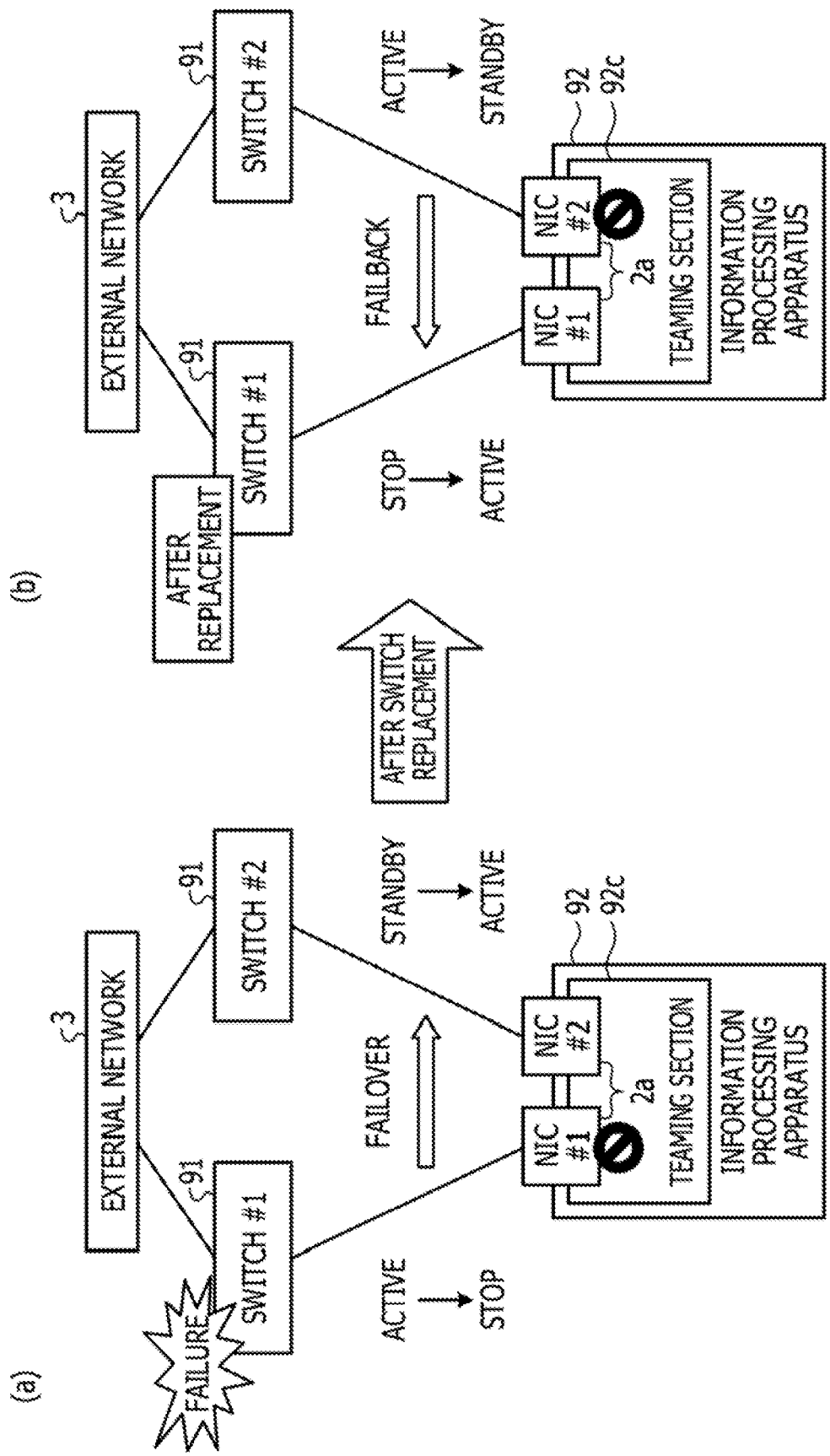
FIG. 7 is diagrams for explaining a teaming operation in an active-standby configuration.

For example, the switches are transmission devices for transmitting data, and the NICs are communication control devices for controlling communications. The term "teaming" means use of a plurality of NICs attached to the information processing apparatus. One of representative teaming configurations is an active-standby configuration. FIG. 7 is diagrams for explaining a teaming operation in an active-standby configuration.

In FIG. 7, an information processing apparatus 92 includes two NICs 2a, which are represented by a NIC #1 and a NIC #2. The NIC #1 is coupled to an external network 3 via a switch 91 represented by a switch #1, and the NIC #2 is coupled to the external network 3 via a switch 91 represented by a switch #2. The information processing apparatus 92 also includes a teaming section 92c. The teaming section 92c controls, as a redundant system, a system #1 including the NIC #1 and the switch #1 and a system #2 including the NIC #2 and the switch #2.

As illustrated in FIG. 7 (*a*), in a state where a path #1 via the NIC #1 and the switch #1 is in an active status and a path #2 via the NIC #2 and the switch #2 is in a standby status, the teaming section 92c performs failover if the switch #1 fails and disables communications between the NIC #1 and the switch #1. For example, the teaming section 92c switches the active path by switching the path #1 from the active status to a stop status and switching the path #2 from the standby status to the active status. Thus, the teaming section 92c switches the active path by the teaming operation, thereby reducing entire stopping of the network system and enabling the continuous operation of the network system.

After that, as illustrated in FIG. 7 (*b*), when the failed switch #1 is replaced, the teaming section 92c performs failback. For example, the teaming section 92c detects a link-up between the NIC #1 and the switch #1, returns the path #1 from the stop status to the active status, and returns the path #2 from the active status to the standby status. In this regard, whether or not to automatically perform failback may be changed by a setting. If automatic failback is not performed, the teaming section 92c turns the path #1 from the stop status to the standby status.

For example, as a technique effective to detect the location of a failure that has occurred on a network or a setting error made by an administrator, a packet transfer path is determined. In this technique, a network failure monitoring apparatus searches a filtering database of each layer 2 switch according to a specified media access control (MAC) address, and finds a port matching with the specified MAC address. Then, the network failure monitoring apparatus determines the packet transfer path based on the found ports of the layer 2 switches and a configuration information table that stores therein network configuration information indicating a coupling relationship between the ports of the layer 2 switches.

For example, multicast communications is continued in the process of switching from the active system to the standby system. In this technique, a data transfer device includes multiple interfaces for transmitting and receiving data, and constructs and retains transfer destination information in which a transmission destination of data is associated with an interface for transmitting the data to be transmitted to the transmission destination. When the data transfer device in a standby system receives data for multicast communications via the interface before the transfer destination information is constructed, the data transfer device transmits the data for multicast communications from one or more interfaces irrespective of the transfer destination information. On the other hand, when the data transfer device in the standby system receives data for multicast communications via the interface after the transfer destination information is constructed, the data transfer device transmits the received data from the interfaces associated with the transmission destinations of the received data in the transfer destination information.

For example, a redundant configuration is established between a layer 2 switch and a transmission device, one end of which is coupled to the layer 2 switch via a transmission path and another end of which is coupled to a relay transmission path, and the path switching is performed without affecting the network. In this technique, the transmission path is composed of a transmission path of an active system and a transmission path of a standby system. When a failure occurs in the transmission path of the active system, the transmission device detects a link-down, forcibly shuts down the transmission path of the active system, stops the packet transmission, and performs MAC address flush of the port of the layer 2 switch. Thereafter, the transmission device performs path switching in which the transmission path of the standby system is switched to the active transmission path, and performs packet transmission via the transmission path newly set as the active system. Thus, the layer 2 switch performs MAC address learning to perform port settings, and continues communications after the occurrence of the failure.

In the failback illustrated in FIG. 7 (b), the communications in the active path are impossible if the switch 91 after replacement is incapable of performing same communications as the switch 91 before replacement due to incorrect settings, a coupling error, or the like. In this case, however, the active path is physically linked up, and therefore failover to the other path is not executed. This causes a problem in that the entire network communications are stopped, resulting in a failure of the network system. The switch setting error may include a case where the switch settings and coupling are performed in a wrong order in which the settings are performed after the coupling is established first.

Figure 8:
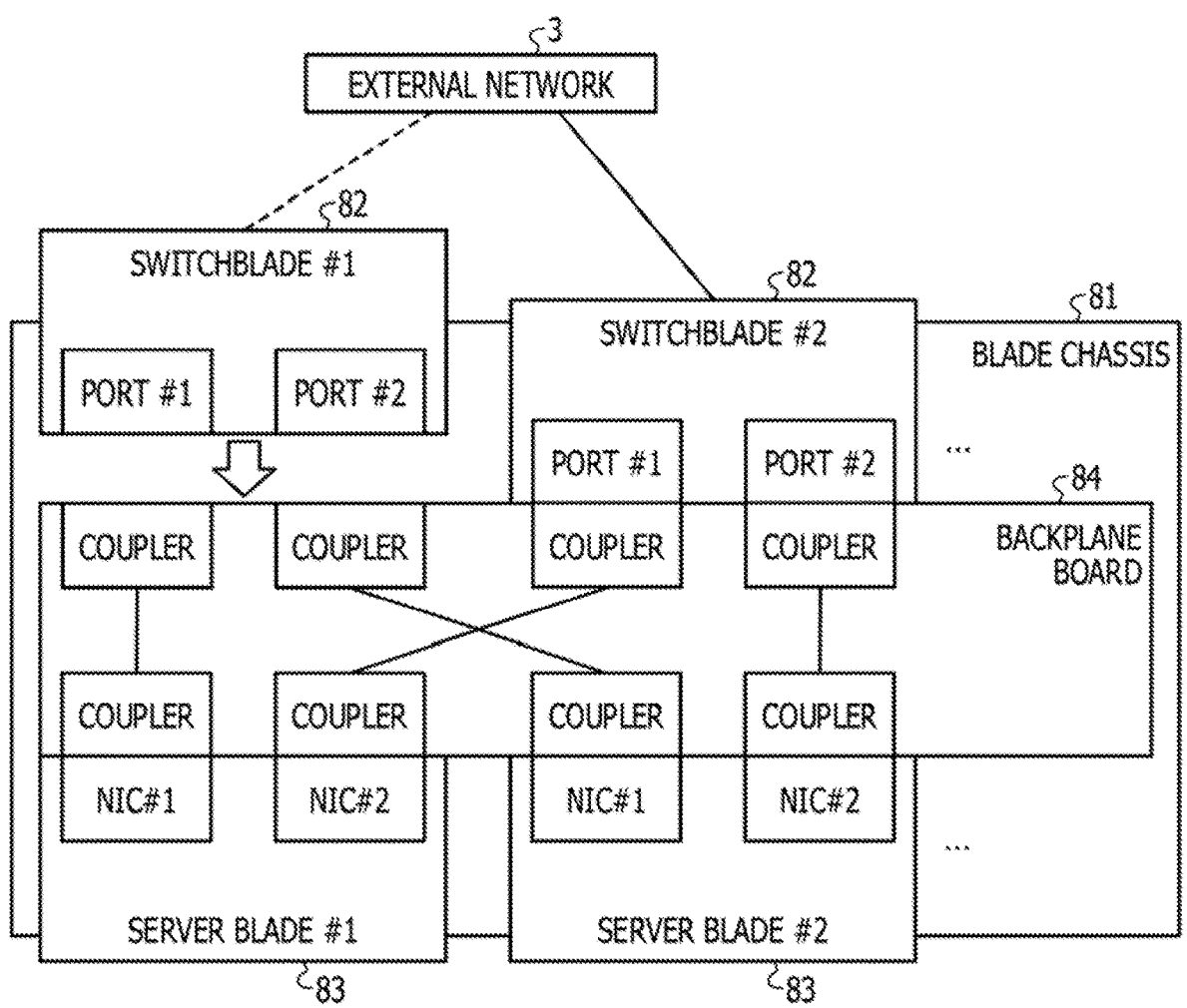
FIG. 8 is a diagram illustrating a configuration of a blade system.

For example, in the case of a SwitchBlade, as illustrated in FIG. 8, upon mounting a SwitchBlade #1 on a blade chassis 81, the SwitchBlade #1 is simultaneously powered on, and is forcibly coupled to a NIC #1 of a server blade #1 via a backplane board 84. As a result, a SwitchBlade 82 is linked up almost simultaneously with the mounting. Since the settings are not usually restored in the SwitchBlade 82 immediately after the maintenance replacement, the SwitchBlade 82 is in an initial setting state (the state where the SwitchBlade 82 is not enabled to perform the same communications as that before the replacement). However, a server blade 83 and the SwitchBlade 82 are linked up and automatic failback is executed, resulting in a high possibility of the occurrence of a failure of the network system.

If the automatic failback is not set and the status of the path is shifted to the standby status after the recovery from the failure, the status transition immediately after the replacement is seen from the teaming section 92c as if it were successful status transition. However, if the settings of the switch are incorrect, the communication will also become impossible when the active path has a failure and the path in the standby status is switched from the standby status to the active status in the future.

In one aspect, a network system failure due to incorrect settings, a coupling error, or the like of the switch 91 after replacement may be reduced.

Hereinafter, an embodiment of an information processing apparatus, a network system, and a computer-readable recording medium having stored therein a teaming program disclosed in this application are described in detail with reference to the drawings. It is to be noted that the embodiment is not intended to limit the technique disclosed herein.

Embodiment

Figure 1:
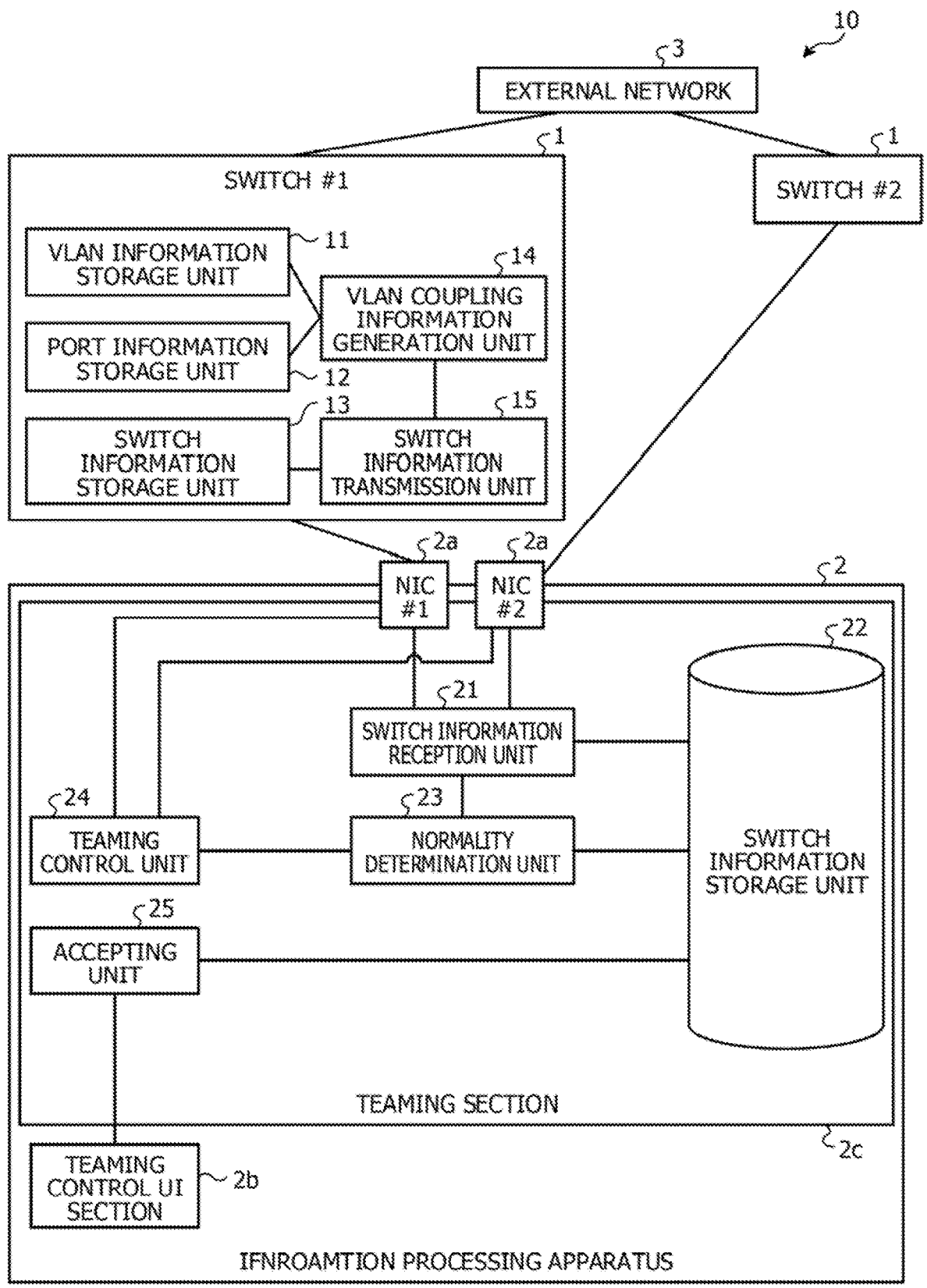
FIG. 1 is a diagram illustrating a configuration of a network system according to an embodiment.

First, a configuration of a network system according to an embodiment is described. FIG. 1 is a diagram illustrating a configuration of a network system according to the embodiment. As illustrated in FIG. 1, a network system 10 includes two switches 1 represented by a switch #1 and a switch #2, and an information processing apparatus 2.

The switch 1 is a transmission device that relays communications between the information processing apparatus 2 and an external network 3. The switches #1 and #2 constitute redundant paths. The switch 1 includes a virtual local area network (VLAN) information storage unit 11, a port information storage unit 12, a switch information storage unit 13, a VLAN coupling information generation unit 14, and a switch information transmission unit 15. Since the switches #1 and #2 have the same functional configuration, FIG. 1 illustrates only the functional configuration of the switch #1.

The VLAN information storage unit 11 stores VLAN-related information. The VLAN-related information includes an identifier of each of ports constituting a VLAN, and tag/untag information of each port. Tag specifies that a frame is transmitted with a VLAN identifier (ID) given thereto, and untag specifies that a frame is transmitted without a VLAN ID given thereto.

The port information storage unit 12 stores port-related information. The port-related information includes a link status of a port. The switch information storage unit 13 stores switch-related information. The switch-related information includes a model name and a serial number.

The VLAN coupling information generation unit 14 first generates VLAN configuration information for each VLAN based on the VLAN-related information and the port-related information. The VLAN configuration information includes a VLAN ID, an identifier of each of ports constituting the VLAN, the tag/untag information of each port, and a link status of each port.

The VLAN coupling information generation unit 14 generates VLAN coupling information for each port by combining together the VLAN configuration information of one or more VLANs allocated to the port. FIGS. 2A and 2B are diagrams illustrating examples of the VLAN coupling information. FIG. 2A illustrates the case where two VLANs are allocated to one port (port #1). FIG. 2B illustrates the case where only one VLAN is allocated to one port (port #2).

As illustrated in FIG. 2A, the VLAN coupling information of the port #1 includes the VLAN configuration information of a VLAN #1 and the VLAN configuration information of a VLAN #10. The VLAN #1 includes a port #1, a port #19, and a port #20. The port #1 is set to untag and is in a status of being linked up (up). The port #19 is set to tag and is in the status of being linked up. The port #20 is set to tag and is in a status of being linked down (down).

The VLAN #10 includes a port #1, a port #2, a port #3, and a port #21. The port #1 is set to tag and is in the status of being linked up. The port #2 is set to tag and is in the status of being linked up. The port #3 is set to tag and is in the status of being linked up. The port #21 is set to tag and is in the status of being linked up.

As illustrated in FIG. 2B, the VLAN coupling information of the port #2 includes the VLAN configuration information of the VLAN #10. The VLAN configuration information of the VLAN #10 is the same as the VLAN configuration information of the VLAN #10 illustrated in FIG. 2A.

The switch information transmission unit 15 combines the VLAN coupling information and the switch-related information to generate switch information for each port, and transmits the switch information to the information processing apparatus 2 from the port for which the switch information is generated. For example, the switch information transmission unit 15 combines the VLAN coupling information illustrated in FIG. 2A and the switch-related information, and transmits the switch information thus generated from the port #1. The switch information transmission unit 15 combines the VLAN coupling information illustrated in FIG. 2B and the switch-related information, and transmits the switch information thus generated from the port #2. The switch information transmission unit 15 transmits the switch information periodically or every time the VLAN coupling information is changed.

The information processing apparatus 2 is an apparatus that performs information processing, and is, for example, a server. The information processing apparatus 2 includes two NICs 2a represented by a NIC #1 and a NIC #2, a teaming control user interface (UI) section 2b, and a teaming section 2c. The NIC 2a is a communication control device that controls communications. The NIC #1 is coupled to the switch #1, and the NIC #2 is coupled to the switch #2.

The teaming control UI section 2b receives an instruction to store a normal state from a system administrator, and instructs the teaming section 2c to store the normal state of the switch 1. The system administrator issues an instruction to store the normal state of the switch 1 by using the teaming control UI section 2b at the time when the network system 10 is determined to be normal.

The teaming section 2c controls, as a redundant system, a system #1 including the NIC #1 and the switch #1 and a system #2 including the NIC #2 and the switch #2. The teaming section 2c includes a switch information reception unit 21, a switch information storage unit 22, a normality determination unit 23, a teaming control unit 24, and an accepting unit 25.

The switch information reception unit 21 receives the switch information transmitted by the switch 1 via the NIC 2a, and uses the received switch information to update the current information associated with the number of the NIC 2a in the switch information storage unit 22. The current information is the current switch information. When the switch information is transmitted from a newly linked-up port of the switch 1 after repair or replacement due to a failure of the switch 1, the switch information reception unit 21 notifies the normality determination unit 23 of the reception of the switch information.

The switch information storage unit 22 stores the current information and normal state information in association with the number of the NIC 2a. The normal state information is the switch information at the time when the network system 10 is in the normal state.

When the normality determination unit 23 is notified of the link-down of the port by the teaming control unit 24 due to a failure of the switch 1, the normality determination unit 23 clears the current information associated with the number of the NIC 2a coupled to the linked-down port. After that, when the normality determination unit 23 is notified of the reception of the switch information from the switch information reception unit 21, the normality determination unit 23 compares the current VLAN coupling information included in the current information with the normal VLAN coupling information included in the normal state information. When the current VLAN coupling information matches with the normal VLAN coupling information, the normality determination unit 23 determines that the switch 1 after repair or replacement is in a normal state, and notifies the teaming control unit 24 that the switch 1 after repair or replacement is in the normal state.

On the other hand, when the current VLAN coupling information is different from the normal VLAN coupling information, there is a possibility of the incorrect settings of the switch 1, an un-restoration of the configuration information, a port coupling error, or the like, and the normality determination unit 23 determines that the switch 1 is not restored to the normal state. The normality determination unit 23 then waits for reception of the new switch information.

Note that the case where the normal state information does not exist means that the normal state of the network system 10 is not confirmed yet. In this case, the normality determination unit 23 notifies the teaming control unit 24 that the switch 1 is in the normal state. The normality determination unit 23 may determine that the switch 1 is restored to the normal state even when the current VLAN coupling information and the normal VLAN coupling information are partly different from each other. For example, when the link status of a specific port is different, the normality determination unit 23 may determine that the switch 1 is restored to the normal state.

When detecting a link-down of a port to which the NIC 2a is coupled, the teaming control unit 24 executes a failover process and also notifies the normality determination unit 23 of the link-down. When the teaming control unit 24 is notified that the switch 1 is in the normal state by the normality determination unit 23, the teaming control unit 24 executes a failback process. Based on the setting, the teaming control unit 24 may perform a process of changing the status to the standby status instead of executing the failback process.

The accepting unit 25 accepts the instruction to store the normal state of the switch 1 from the teaming control UI section 2b, and copies the current information in the switch information storage unit 22 to the normal state information.

Figure 3:
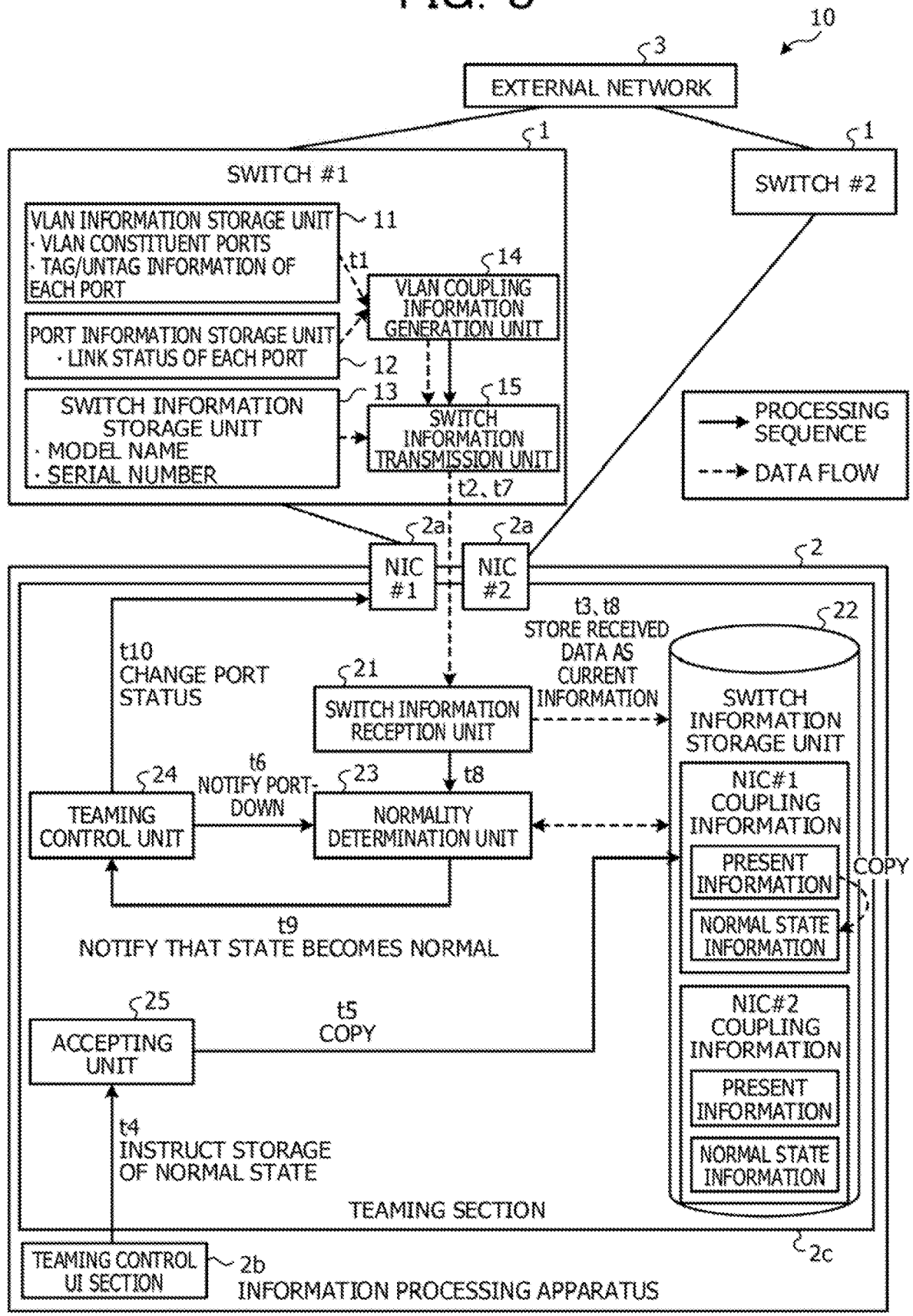
FIG. 3 is a diagram for explaining a teaming operation performed by switches and an information processing apparatus.

Next, a description is given of a teaming operation performed by the switches 1 and the information processing apparatus 2. FIG. 3 is a diagram for explaining the teaming operation performed by the switches 1 and the information processing apparatus 2. In FIG. 3, solid-line arrows indicate a processing sequence, and dotted-line arrows indicate a data flow. FIG. 3 illustrates a case where the switch #1 is restored to the normal state by repair or replacement after the occurrence of a failure.

As illustrated in FIG. 3, the VLAN coupling information generation unit 14 of the switch #1 generates the VLAN coupling information based on the VLAN-related information and the port-related information (t1). Then, the switch information transmission unit 15 generates the switch information based on the VLAN coupling information and the switch-related information, and transmits the switch information to the information processing apparatus 2 from the port for which the switch information is generated (t2).

Then, the switch information reception unit 21 of the information processing apparatus 2 receives the switch information and stores the received switch information as the current information in the switch information storage unit 22 (t3). Thereafter, the teaming control UI section 2b instructs the accepting unit 25 to store the normal state based on the instruction from the system administrator (t4). Then, the accepting unit 25 copies the current information in the switch information storage unit 22 to the normal state information (t5).

After that, when detecting a link-down of a port of the switch #1, the teaming control unit 24 notifies the normality determination unit 23 of the link-down of the port (t6). The normality determination unit 23 clears the current information associated with the concerned NIC 2a in the switch information storage unit 22, and waits for a notification from the switch information reception unit 21. The concerned NIC 2a is the NIC 2a coupled to the linked-down port.

Thereafter, the switch information reception unit 21 receives the switch information (t7), stores the switch information as the current information in the switch information storage unit 22, and notifies the normality determination unit 23 of the reception of the switch information (t8). The normality determination unit 23 compares the current VLAN coupling information with the normal VLAN coupling information, and thereby determines whether or not the switch #1 that has transmitted the switch information is in the normal state.

When the switch #1 is in the normal state, the normality determination unit 23 notifies the teaming control unit 24 that the switch #1 has turned to the normal state (t9). The teaming control unit 24 then changes the port status of the NIC #1 to the standby status (t10). Alternatively, the teaming control unit 24 may perform the failback process based on the setting.

Figure 4:
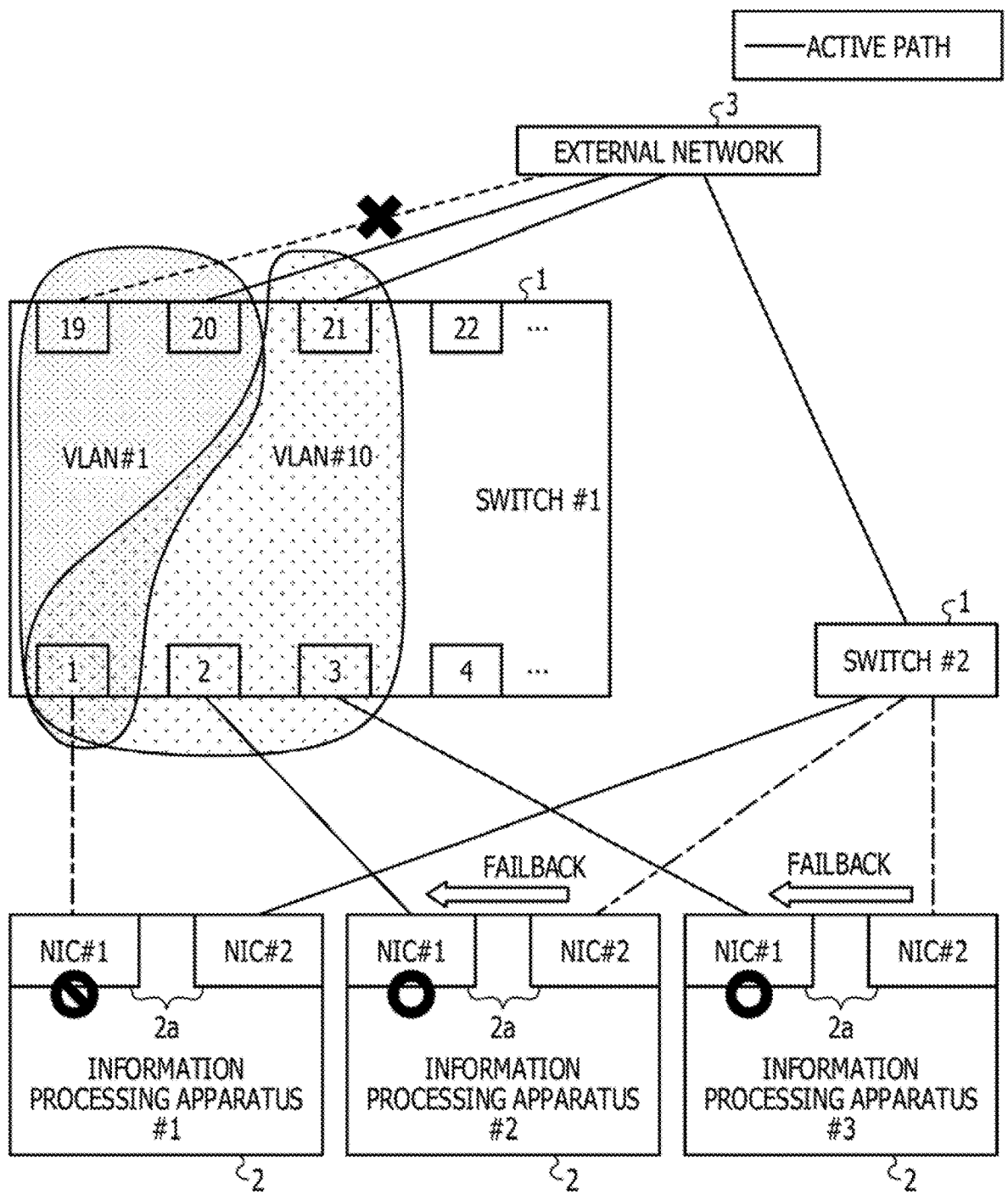
FIG. 4 is a diagram for explaining the port independence in the teaming operation.

The teaming operation illustrated in FIG. 3 is carried out independently for each port, and even when any of the ports is not in the normal state, the other ports are not affected. FIG. 4 is a diagram for explaining the port independence of the teaming operation. In FIG. 4, "1" "2", "3", "4", ... "19", "20", "21", "22", ... , included in the switch #1 are port numbers. The VLAN #1 includes the port #1, the port #19, and the port #20. The VLAN #10 includes the port #1, the port #2, the port #3, and the port #21.

The information processing apparatuses #1 to #3 each include a NIC #1 and a NIC #2. It is assumed that the switch #1 has a failure while the NIC #1 sides in the information processing apparatuses #1 to #3 are active, and that the port #19 after repair or replacement of the switch #1 is not coupled by a cable due to a careless error or the port #19 is erroneously set.

In this case, since the VLAN configuration information of the VLAN #1 including the port #19 is different from the normal VAN configuration information, the VLAN coupling information of the port #1 included in the VLAN #1 is different from the normal VLAN coupling information. Therefore, the NIC #1 of the information processing apparatus #1 is not enabled to perform communications. On the other hand, the VLAN configuration information of the VLAN #10 that does not include the port #19 is the same as the normal VLAN configuration information, and the VLAN coupling information of the ports #2 and #3 that are included only in the VLAN #10 is the same as the normal VLAN coupling information. Therefore, the NICs #1 of the information processing apparatuses #2 and #3 are enabled to perform communications and failback is performed.

Figure 5A:
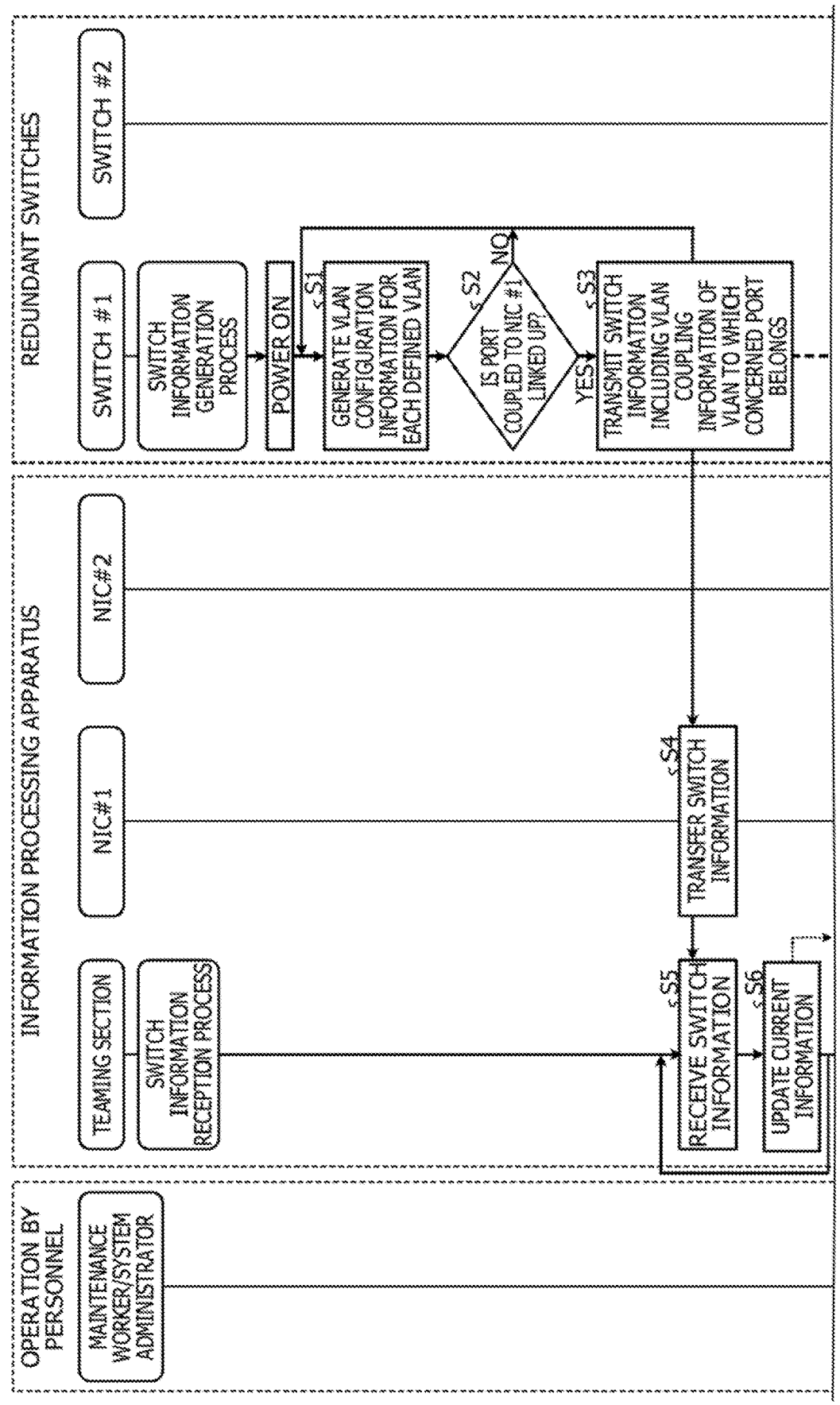
Figure 5B:
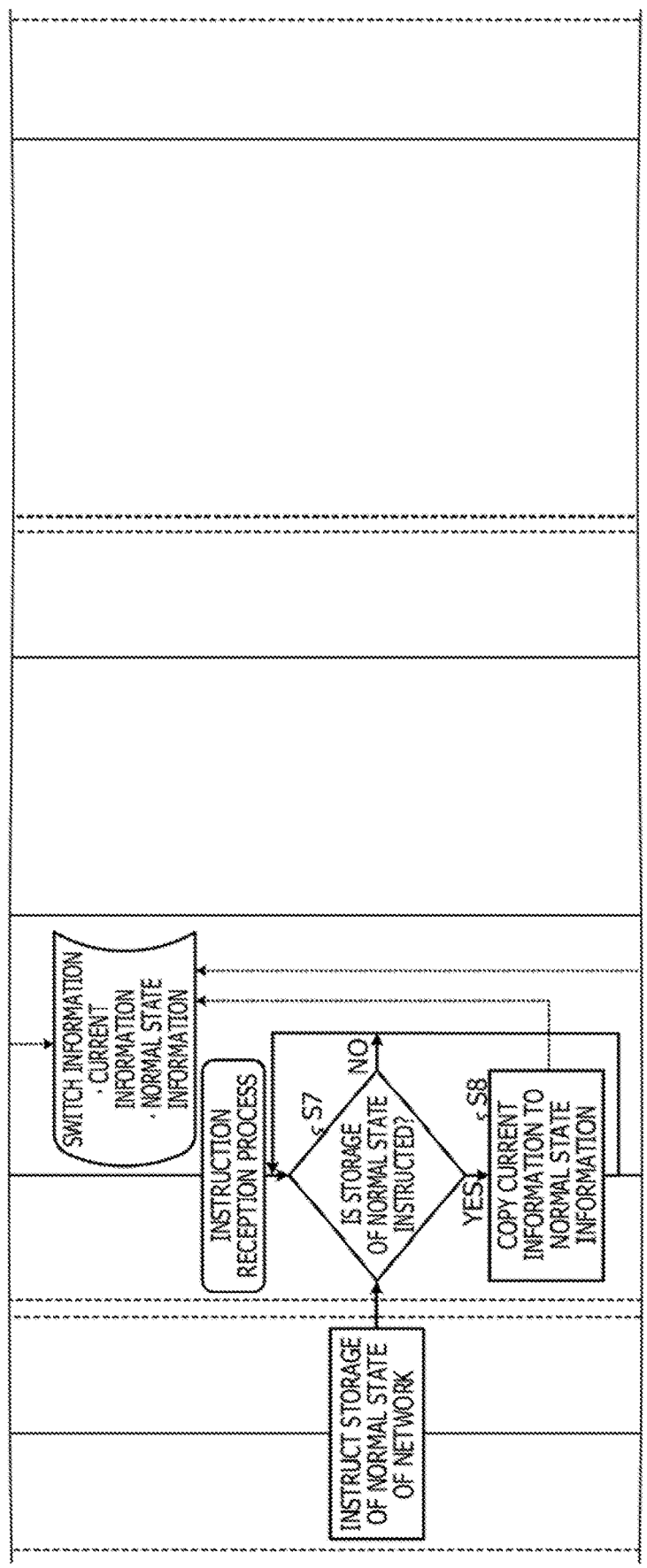

Next, a description is given of the sequence of a teaming process. FIGS. 5A to 5E are diagrams illustrating the sequence of the teaming process. As illustrated in FIGS. 5A and 5B, the switch #1 performs processing in steps S1 to S3 described below as a switch information generating process. For example, when the switch #1 is powered on, the switch #1 generates the VLAN coupling information for each already-defined VLAN (step S1), and determines whether or not the port coupled to the NIC #1 is linked up (step S2).

When the port coupled to the NIC #1 is not linked up, the switch #1 causes the process to return to step S1. On the other hand, when the port coupled to the NIC #1 is linked up, the switch #1 transmits the switch information including the VLAN coupling information of the VLAN to which the concerned port, which is the port coupled to the NIC #1, belongs (step S3), and the process returns to step S1.

Then, the NIC #1 transfers the switch information to the information processing apparatus 2 (step S4). The teaming section 2c receives the switch information (step S5) and updates the current information (step S6) as a switch information receiving process. The teaming section 2c iterates the processing in steps S5 and S6.

Thereafter, the teaming section 2c determines whether or not there is an instruction to store the normal state as an instruction accepting process (step S7). If the system administrator issues an instruction to store the normal state of the network system 10, the teaming section 2c copies the current information to the normal state information (step S8). While there is no instruction to store the normal state, the teaming section 2c iterates step S7.

After that, as illustrated in FIGS. 5B to 5E, when the switch #1 fails and the NIC #1 is linked down, the teaming section 2c executes processing in steps S9 to S13 and steps S18 to S28 described below as a teaming execution process.

For example, the teaming section 2c detects a link-down (step S9), and performs the failover process (step S10). As the failover process, the teaming section 2c stops the NIC #1 in the active status, and switches the NIC #2 and the switch #2 from the standby status to the active status. Then, the system #2 starts communications. Further, the teaming section 2c clears the current information (step S11).

After that, when the maintenance worker repairs or replaces the switch #1 and powers on the switch #1, the NIC #1 is linked up. The teaming section 2c detects the link-up (step S12), and changes the link status to the link-up status (step S13).

The switch #1 generates the VLAN coupling information for each already-defined VLAN (step S14), and determines whether or not the port coupled to the NIC #1 is linked up (step S15).

When the port coupled to the NIC #1 is not linked up, the switch #1 causes the process to return to step S14. On the other hand, when the port coupled to the NIC #1 is linked up, the switch #1 transmits the switch information including the VLAN coupling information of the VLAN to which the concerned port belongs (step S16), and the process returns to step S14.

Then, the NIC #1 transfers the switch information to the information processing apparatus 2 (step S17). The teaming section 2c executes a switch information reception process loop (step S18). The switch information reception process loop is to iterate the processing of receiving the switch information (step S5) and updating the current information (step S6) as illustrated in FIGS. 5A and 5B.

Figure 5D:
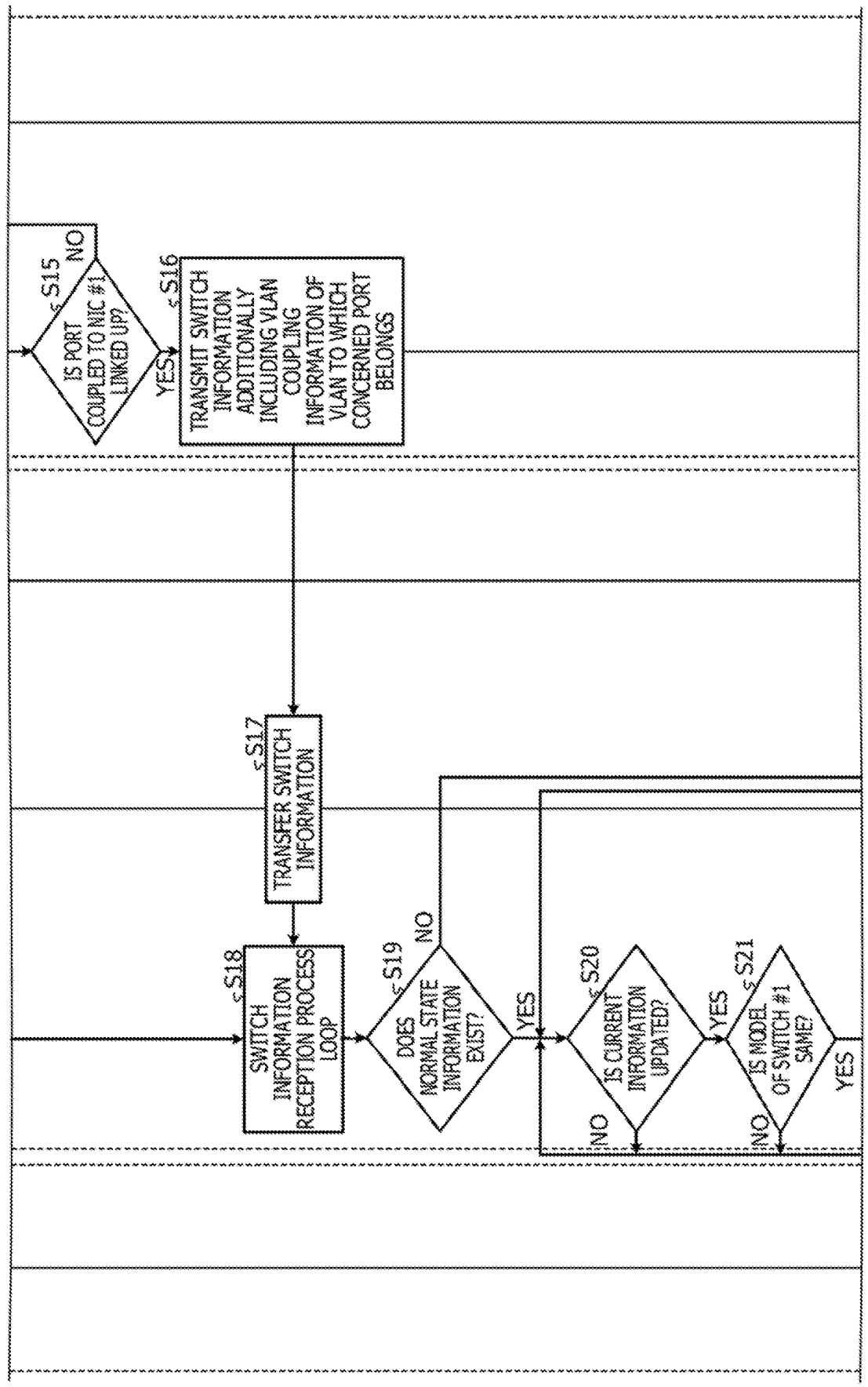
Figure 5E:
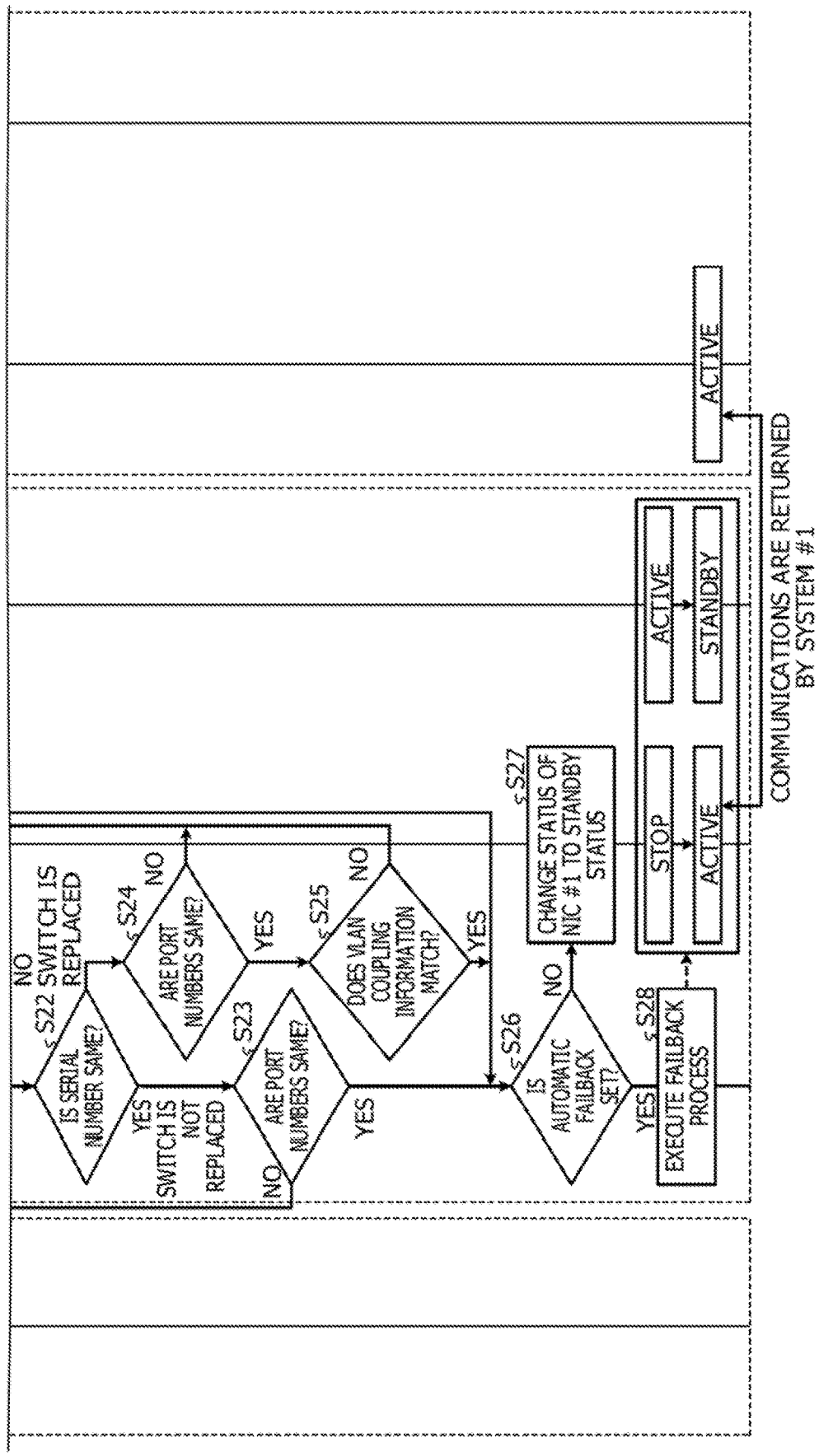

When the switch information is received, the teaming section 2c determines whether or not the normal state information exists (step S19) as illustrated in FIG. 5D. If the normal state information does not exist, the process proceeds to step S26. On the other hand, if the normal state information exists, the teaming section 2c determines whether or not the current information is already updated (step S20). If the current information is not updated yet, the teaming section 2c waits for updating. On the other hand, if the current information is already updated, the teaming section 2c determines whether or not the model of the switch #1 is the same as that before repair or replacement (step S21). The process returns to step S20 if the model is not the same.

On the other hand, if the model of the switch #1 is the same, the teaming section 2c determines whether or not the serial number of the switch #1 is the same as that before repair or replacement (step S22). The case where the serial number is the same means that the switch is not replaced. In this case, the teaming section 2c determines whether or not the port numbers are the same as those before repair or replacement (step S23). The process returns to step S20 if the port numbers are not the same. The process proceeds to step S26 if the port numbers are the same.

On the other hand, the case where the serial number is not the same means that the switch is replaced. In this case, the teaming section 2c determines whether or not the port numbers are the same as those before repair or replacement (step S24). The process returns to step S20 if the port numbers are not the same. On the other hand, if the port numbers are the same, the teaming section 2c determines whether or not the VLAN coupling information matches with the normal VLAN coupling information (step S25). The process returns to step S20 if the VLAN coupling information does not match.

On the other hand, if the VLAN coupling information matches, the teaming section 2c determines whether or not the automatic failback is set (step S26). If the automatic failback is not set, the teaming section 2c changes the status of the NIC #1 to the standby status (step S27). On the other hand, if the automatic failback is set, the teaming section 2c performs the failback process (step S28). As the failback process, the teaming section 2c switches the NIC #1 from the stop status to the active status, switches the NIC #2 from the active status to the standby status, and switches the switch #1 to the active status. Then, the system #1 starts communications.

As described above, in the embodiment, the switch information storage unit 22 stores, as the normal state information for every coupled port, the switch information at the time when the network system 10 is in the normal state. Then, when the coupled switch 1 is repaired or replaced after the failure and transmits the switch information, the normality determination unit 23 compares the VLAN coupling information included in the transmitted switch information with the normal VLAN coupling information. The normality determination unit 23 controls communications with the switch 1 after repair or replacement based on the comparison result. In this way, the information processing apparatus 2 is capable of reducing a communication failure of the network system 10 due to an error in the switch replacement procedure, incorrect switch settings, an error in the port coupling, or the like.

In the embodiment, the switch information includes the VLAN configuration information of the VLAN to which the switch port belongs. Thus, the information processing apparatus 2 is capable of accurately detecting an error in the switch replacement procedure, incorrect switch settings, an error in the port coupling, and the like for the VLAN.

In the embodiment, the switch information reception unit 21 receives the switch information from the switch 1, and updates the current information in the switch information storage unit 22. Then, the accepting unit 25 copies the current information to the normal state information based on the instruction to store the normal state issued by the system administrator. Therefore, the information processing apparatus 2 is capable of storing, as the normal state information, the switch information at the time when the network system 10 is in the normal state.

In the embodiment, even if the normal state information does not exist, the normality determination unit 23 already determines that the switch 1 after repair or replacement is normal. As a result, the information processing apparatus 2 is enabled to perform failback even when the normal state of the network system 10 is not confirmed yet.

While the teaming section 2c has been described in the embodiment, a teaming program having substantially the same functions may be obtained by implementing the configuration of the teaming section 2c by software. Accordingly, a hardware configuration of the information processing apparatus 2 that executes the teaming program is described.

Figure 6:
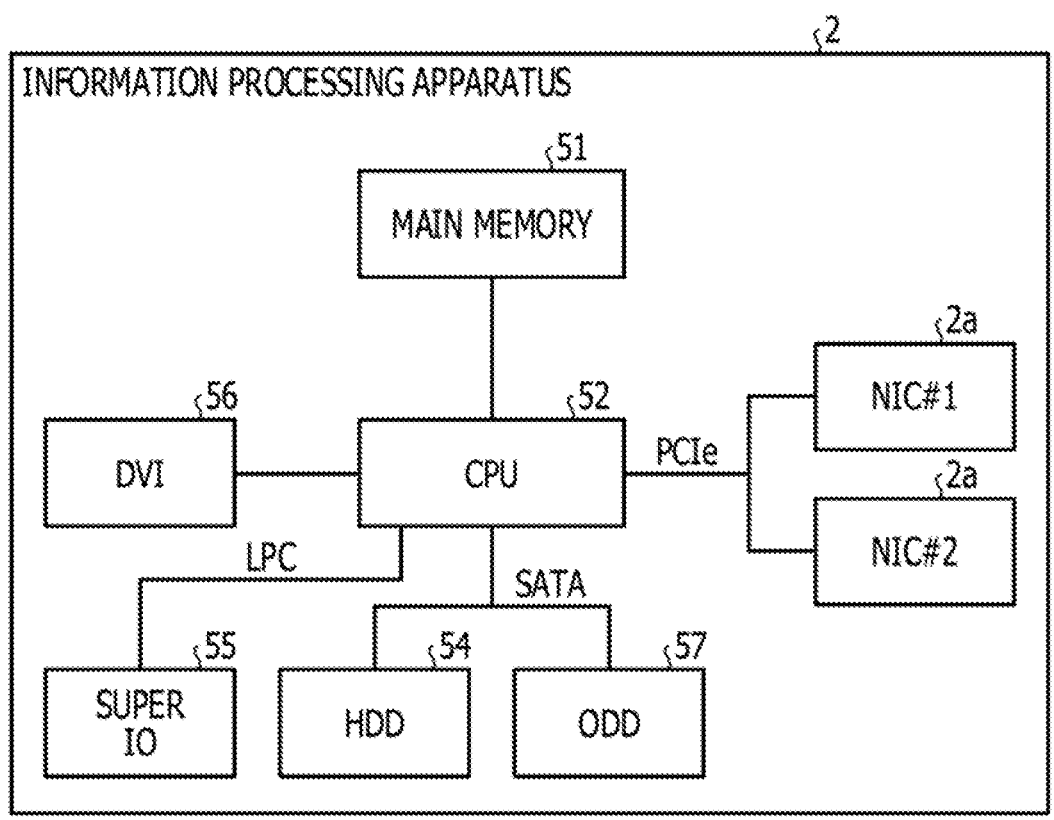
FIG. 6 is a diagram illustrating a hardware configuration of the information processing apparatus for executing a teaming program according to the embodiment.

FIG. 6 is a diagram illustrating the hardware configuration of the information processing apparatus 2 for executing the teaming program according to the embodiment. As illustrated in FIG. 6, the information processing apparatus 2 includes a main memory 51, a central processing unit (CPU) 52 as an example of a processor, the NIC #1, the NIC #2, and a hard disk drive (HDD) 54. The information processing apparatus 2 further includes a super input output (IO) 55, a digital visual interface (DVI) 56, and an optical disk drive (ODD) 57.

The main memory 51 is a memory for storing a program, processing results during program execution, and the like. The CPU 52 is a central processing unit for reading the program from the main memory 51 and executing the program. The CPU 52 includes a chipset including a memory controller.

The HDD 54 is a disk device for storing the program and data. The super IO 55 is an interface for coupling input devices such as a mouse and a keyboard. The DVI 56 is an interface for coupling a liquid crystal display device. The ODD 57 is a device for reading and writing of a digital versatile disc (DVD) and a compact disc-recordable (CD-R).

The NIC #1 and the NIC #2 are coupled to the CPU 52 by way of Peripheral Component Interconnect Express (PCIe). The HDD 54 and the ODD 57 are coupled to the CPU 52 by way of Serial Advanced Technology Attachment (SATA). The super IO 55 is coupled to the CPU 52 by way of Low Pin Count (LPC).

The teaming program to be executed by the information processing apparatus 2 is stored on a CD-R which is an example of a recording medium readable by the information processing apparatus 2, is read from the CD-R by the ODD 57, and is installed in the information processing apparatus 2. Alternatively, the teaming program is stored in a database or the like of another computer system coupled via the NIC #1 or the NIC #2, is read from the database or the like, and is installed in the information processing apparatus 2. The teaming program thus installed is stored in the HDD 54, is read to the main memory 51, and is executed by the CPU 52.

The embodiment is described above for the case where the communications are performed using the VLAN, but the information processing apparatus 2 may perform communications by using another network. The embodiment is described above for the case where communications are performed via the switch 1 and the external network 3, but the information processing apparatus 2 may perform communications via another network and a transmission device other than the switch 1.

The embodiment is described above for the case where the switch information is stored, but the information processing apparatus 2 may store the VLAN coupling information instead of the switch information, or may store the VLAN coupling information and the switch-related information separately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
    a memory; and
    a processor coupled to the memory and configured to:
    perform switching to a transmission device in a standby status of transmission devices in a redundant configuration when a transmission device under operation of the transmission devices in the redundant configuration fails;
    store, as normal coupling information, coupling information at a time when a network system, which is constituted by the information processing apparatus and the transmission devices in the redundant configuration, is normal, the coupling information being information on a transmission device port to which a communication control device included in the information processing apparatus is coupled;
    when the transmission device to which the communication control device is coupled is repaired or replaced, determine whether or not the coupling information transmitted from the transmission device after the repair or replacement matches with the normal coupling information; and
    control communications between the communication control device and the transmission device port to which the communication control device is coupled based on the determination result.

2. The information processing apparatus according to claim 1, wherein the coupling information includes information on transmission device ports which constitute a VLAN to which the transmission device port belongs.

3. The information processing apparatus according to claim 1, wherein the processor is configured to:
    receive the coupling information from the transmission device which is powered on and stores the coupling information as current coupling information in the memory; and
    store the current coupling information as the normal coupling information in the memory based on an instruction to store a normal state.

4. The information processing apparatus according to claim 1, wherein
    when the normal coupling information does not exist, the processor is configured to determine that the transmission device after the repair or replacement is normal, and
    when determining that the transmission device after the repair or replacement is normal, the processor is configured to start communications between the communication control device and the transmission device port to which the communication control device is coupled.

5. The information processing apparatus according to claim 2, wherein
    the transmission device is a switch,
    the communication control device is a network interface card, and
    the information on the transmission device port includes an identifier of the transmission device port, information indicating tag or untag set for the transmission device port, and a link status.

6. A network system comprising:
    transmission devices in a redundant configuration; and
    an information processing apparatus that performs switching to the transmission device in a standby status when the transmission device under operation fails, wherein
    each of the transmission devices is configured to:
    generate coupling information for each transmission device port, the coupling information being information on the transmission device port; and
    transmit the coupling information which is generated, and the information processing apparatus is configured to:
    receive the coupling information which is transmitted;
    stores, as normal coupling information, the coupling information which is received when the network system is normal;
    when the transmission device under operation fails and is repaired or replaced, determine whether or not the coupling information which is transmitted from the transmission device after the repair or replacement matches with the normal coupling information; and
    control communications with the transmission device after the repair or replacement based on the determination result.

7. The network system according to claim 6, wherein the coupling information includes information on transmission device ports which constitute a VLAN to which the transmission device port belongs.

8. The network system according to claim 6, wherein
    the information processing apparatus is configured to:
    receive the coupling information and stores the coupling information as current coupling information in a memory; and
    store the current coupling information as the normal coupling information in the memory based on an instruction to store a normal state.

9. A non-transitory computer-readable recording medium having stored therein a teaming program that is executed by an information processing apparatus and causes the information processing apparatus to execute a process, the information processing apparatus being configured to construct a network system together with transmission devices in a redundant configuration and being configured to perform switching to the transmission device in a standby status when the transmission device under operation fails, the process comprising:

storing, as normal coupling information in a memory, coupling information at a time when the network system is normal, the coupling information being information on a transmission device port to which a communication control device included in the information processing apparatus is coupled;

determining, when the transmission device to which the communication control device is coupled is repaired or replaced, whether or not the coupling information transmitted from the transmission device after the repair or replacement matches with the normal coupling information; and controlling communications between the communication control device and the transmission device port to which the communication control device is coupled based on a result obtained in the determining.

10. The non-transitory computer-readable recording medium according to claim 9, wherein the coupling information includes information on transmission device ports which constitute a VLAN to which the transmission device port belongs.

11. The non-transitory computer-readable recording medium according to claim 9, the process further comprising:

receiving the coupling information from the transmission device powered on and storing the coupling information as current coupling information in the memory; and storing the current coupling information as the normal coupling information in the memory based on an instruction to store a normal state.

\* \* \* \* \*